United States Patent [19]

Swann et al.

[11] Patent Number: 5,249,824
[45] Date of Patent: Oct. 5, 1993

[54] AIR BAG STRUCTURE AND METHOD OF FORMING

[75] Inventors: Timothy A. Swann; Bruce R. Hill, both of Mesa, Ariz.

[73] Assignee: TRW Inc., Lyndhurst, Ohio

[21] Appl. No.: 794,998

[22] Filed: Nov. 19, 1991

[51] Int. Cl.⁵ ............................................. B60R 21/24
[52] U.S. Cl. ..................................... 280/729; 280/739
[58] Field of Search ............... 280/729, 739, 738, 728, 280/743, 730, 731, 732

[56] References Cited

U.S. PATENT DOCUMENTS

| 3,473,824 | 10/1969 | Carey et al. | |
| 3,476,402 | 11/1969 | Wilfert . | |
| 3,586,347 | 6/1971 | Carey . | |
| 3,614,127 | 11/1971 | Glance . | |
| 3,618,981 | 11/1971 | Leising . | |
| 3,638,755 | 2/1972 | Sack . | |
| 3,761,111 | 9/1973 | Kemper . | |
| 3,791,666 | 2/1974 | Shibamoto . | |
| 3,814,458 | 6/1974 | Acs . | |
| 3,836,169 | 9/1974 | Schiesterl . | |
| 3,843,151 | 10/1974 | Lewis . | |
| 3,900,210 | 8/1975 | Lohr et al. | |
| 4,006,918 | 2/1977 | MacFarland | 280/729 |
| 4,013,305 | 3/1977 | Ichihara | 280/742 |
| 4,136,894 | 1/1979 | Ono et al. | 280/729 |
| 4,265,468 | 5/1981 | Suszko et al. | 280/729 |
| 4,360,223 | 11/1982 | Kirchoff | 280/729 |
| 5,100,168 | 3/1992 | Horiuchi | 280/728 |

FOREIGN PATENT DOCUMENTS

| 52-5126 | 1/1977 | Japan | 280/731 |
| 1-247242 | 10/1989 | Japan | 280/728 |
| 1-311930 | 12/1989 | Japan | 280/728 |
| 3-10946 | 1/1991 | Japan | 280/728 |
| 3-281460 | 12/1991 | Japan | 280/729 |
| 89/00791 | 2/1990 | PCT Int'l Appl. | 280/728 |

OTHER PUBLICATIONS

Blueprint, Inland Div. of General Motors Corporation "Cushion Assembly-Air Steering Wheel", Apr. 12, 1986.

Primary Examiner—Karin L. Tyson
Attorney, Agent, or Firm—Calfee, Halter & Griswold

[57] ABSTRACT

A vehicle air bag structure comprises an outer bag which is expansible to a predetermined three dimensional configuration and an expansible inner bag which is located in an internal fluid cavity of the outer bag. The outer bag forms an impact area at a predetermined location when expanded to its predetermined three dimensional configuration. The inner and outer air bags have respective mouth portions which are attached together, and a mouth 46 of the air bag structure 14 is formed at the location of this attachment. The mouth defines a fluid inlet opening, which directs fluid from an external source into the inner bag, and fastening structure which enables the air bag to be fastened to a part of a vehicle air bag assembly. The inner bag is expansible to a predetermined three dimensional configuration, and has a plurality of vent openings for directing fluid from the inner bag into the internal cavity of the outer bag in a direction away from the occupant impact area. The inner bag is formed by a pair of front and rear inner panels and the outer bag is formed by a pair of front and rear outer panels. In forming the air bag, the vent openings are initially provided in the rear inner panel. Then, the rear inner and outer panels are joined together and the mouth of the air bag is formed in the rear inner and outer panels. Finally, the front outer and inner panels are connected to the rear outer and inner panels, respectively, to complete the outer and inner bags.

21 Claims, 7 Drawing Sheets

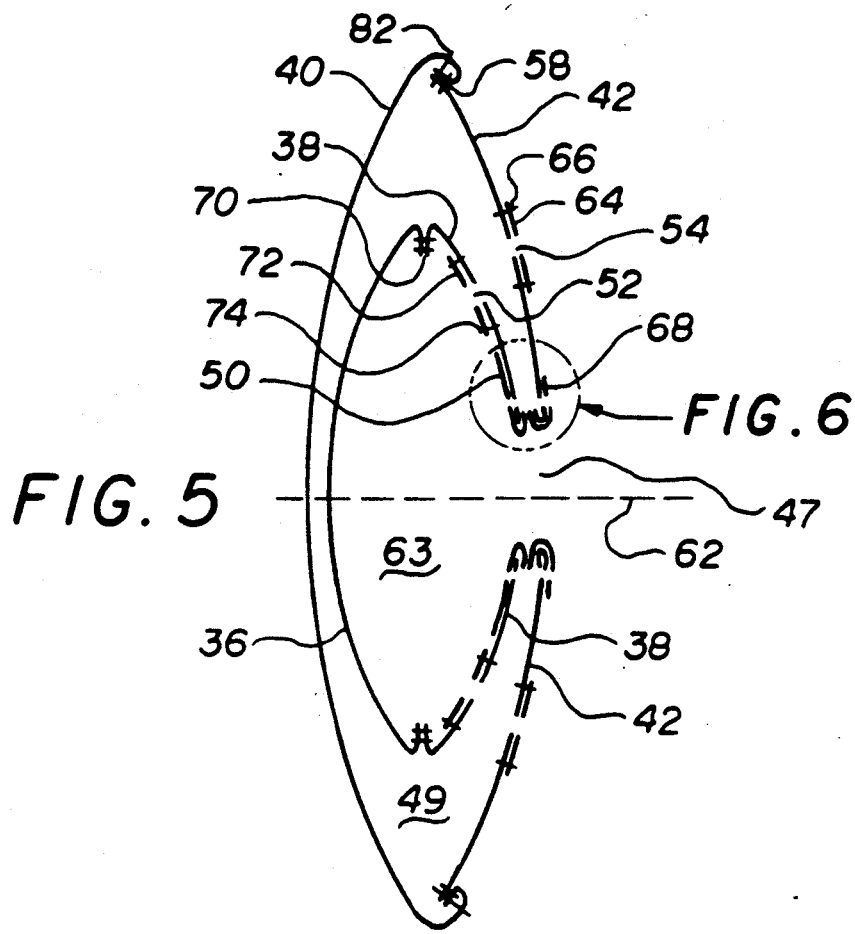
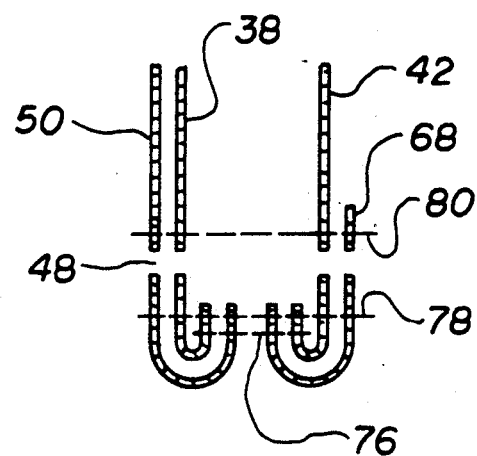

AIR BAG STRUCTURE AND METHOD OF FORMING

TECHNICAL FIELD

The present invention relates to a vehicle air bag structure and to a method of forming the vehicle air bag structure. In particular, the present invention relates to a vehicle air bag of the "bag-within-a-bag" type, wherein an inner bag is disposed within an outer bag and redirects fluid into the outer bag in a particular flow pattern to inflate the outer bag.

BACKGROUND OF THE INVENTION

A typical vehicle air bag assembly comprises a container, an inflatable air bag disposed in the container, and an inflator in proximity, to the inflatable air bag. The inflatable air bag is commonly formed of flexible fabric material such as nylon, and is generally stored in the container in a collapsed, folded condition. The air bag has a fluid inlet opening through which fluid (e.g., gas) under pressure can be directed into the air bag. The perimeter of the fluid inlet opening (often referred to as the "mouth" of the air bag) is attached to the container and/or the inflator.

At the onset of a collision, the inflator is actuated and rapidly directs an inert, non-toxic gas (e.g., nitrogen) into the fluid inlet opening in the air bag. The gas forces the air bag out of the container and rapidly inflates the air bag to a predetermined configuration. When inflated to its predetermined configuration, the air bag cushions a vehicle occupant against impact with a structural part of the vehicle.

A known type of vehicle air bag structure essentially comprises a "bag-within-a-bag." An inflatable outer bag is designed to be inflated to a predetermined three dimensional configuration and has an occupant impact area which engages a vehicle occupant who is being pitched toward a structural part of the vehicle by the force of a collision. An inner bag is disposed within the outer bag. The inner bag receives fluid from the inflator and directs the fluid into the outer bag in a predetermined manner, to inflate the outer bag to its predetermined configuration.

For example, in U.S. Pat. No. 3,473,824, fluid is directed into an inner bag. When the pressure in the inner bag reaches a predetermined level, the forward end of the inner bag bursts to allow the fluid to flow forwardly into an outer bag. The inner bag absorbs the kinetic energy of the initial flow of fluid and thereby reduces the possibility that the outer bag will strike an occupant of the vehicle too forcefully. In U.S. Pat. No. 3,900,210, an inflating gas is initially directed into an expandable, elastic inner bag which is contained within an outer bag. As the inner bag expands fluid is directed through apertures in the inner bag into the outer bag in a "forward" direction, i.e., toward the occupant impact area of the outer bag. In a somewhat similar construction, shown in U.S. Pat. No. 3,814,458, an expansible inner bag is not provided with any apertures. Instead, the inner bag expands to conform to the dimensions of the larger outer bag. The expansion of the inner bag dissipates the energy of the inflating gas and physically expands the outer bag to its predetermined three dimensional configuration.

In addition to air bag structures of the "bag-within-a-bag" type, there are air bag structures in which a fluid deflector is disposed within an air bag and deflects fluid from the inflator in predetermined directions to inflate the air bag. For example, in U.S. Pat. No. 3,836,169, a deflector comprises an impervious parachute canopy coupled to an air bag assembly by a porous mesh. The parachute canopy causes fluid directed through the mouth of the air bag to be redirected within the air bag. The patentee states that the purpose of the canopy parachute is to produce a sound deadening effect for the flow of fluid into the air bag. Another example of a fluid deflector within an air bag is shown in U.S. Pat. No. 4,265,468, wherein the deflector is in the shape of a cylinder which is open at both ends. The fluid flows into the cylinder and is then deflected in transverse directions so as to inflate the air bag.

SUMMARY OF THE INVENTION

The present invention relates to a new and useful structure and method of forming a vehicle air bag of the "bag-within-a-bag" type. The air bag structure directs flow in a unique pattern compared to previous "bag-within-a-bag" (or fluid deflector) types of air bag structures. Moreover, the air bag structure of the present invention is believed to be efficient to manufacture by mass production techniques. Still further, the air bag structure is capable of being preformed and attached as a complete unit to an air bag assembly. Additionally, the air bag structure is designed for incorporation into relatively compact air bag assemblies.

According to the present invention, the air bag structure comprises an outer bag and an inner bag, each formed of flexible material, with the inner bag disposed inside the outer bag. The outer bag has an internal fluid cavity and is expansible to a predetermined three dimensional configuration when fluid is directed into the internal cavity. A predetermined portion of the outer bag forms an occupant impact area where the outer bag is expanded to its three dimensional configuration. The inner bag is located in the internal cavity in the outer bag and is designed to be inflated to a predetermined configuration when fluid is directed into the inner bag. The inner and outer bags have respective mouth portions which are joined to each other. A mouth for the complete air bag structure is thus formed in such mouth portions. The mouth defines (i) a fluid inlet opening surrounding a central axis and providing fluid communication with the inside of the inner bag and (ii) structure for fastening the air bag to a vehicle air bag assembly. The inner bag has venting structure for directing fluid into the internal fluid cavity of the outer bag in a pattern that is outward with respect to the central axis and rearward with respect to the occupant impact area of the outer bag. The flow pattern is believed to be a new and useful flow pattern for a "bag-within-a-bag" (or flow deflector) type of air bag structure.

According to the preferred embodiment, the outer bag is formed of front and rear panels having peripheral edges which are connected to each other in a manner which enables the front and rear panels to bow outward relative to each other when fluid is directed into said internal cavity. The inner bag is also formed by front and rear panels of flexible material having peripheral edges which are connected to each other in a manner which enables the front and rear panels to bow outward relative to each other when fluid is directed into said inner bag. A portion of the front panel of the outer bag forms the occupant impact area when the outer bag is expanded to its predetermined configuration. The mouth portions of the inner and outer bags are folded in the rear panels of the inner and outer bags. The inner bag is formed of substantially impervious fabric material, and the venting structure is formed in the rear panel of the inner bag.

An air bag according to the invention is formed by (i) forming the venting structure in the rear panel of the inner bag, (ii) connecting the mouth portions of the rear panels of the inner and outer bags with each other, (iii) forming the mouth of the air bag in the mouth portions of the rear panels, and (iv) connecting the front panels of the inner and outer bags to the rear panels of the inner and outer bags, respectively, to complete the inner and outer bags. Heat protection and/or reinforcement materials may be coupled to the mouth portions of the rear panels of the inner and outer bags at the time the rear panels are joined together. The heat protection and/or reinforcement materials are then incorporated into the mouth of the air bag at the time the mouth is formed in the rear panels.

Additional features of the present invention will become apparent from the following detailed description and the accompanying drawings.

BRIEF DESCRIPTION OF THE DRAWINGS

FIG. 5 is a schematic, sectional illustration of the air bag of FIGS. 3 and 4;

FIG. 6 is an enlarged view of the area of the air bag shown at 6 in FIG. 5;

DETAILED DESCRIPTION OF THE PREFERRED EMBODIMENTS

Figure 1:
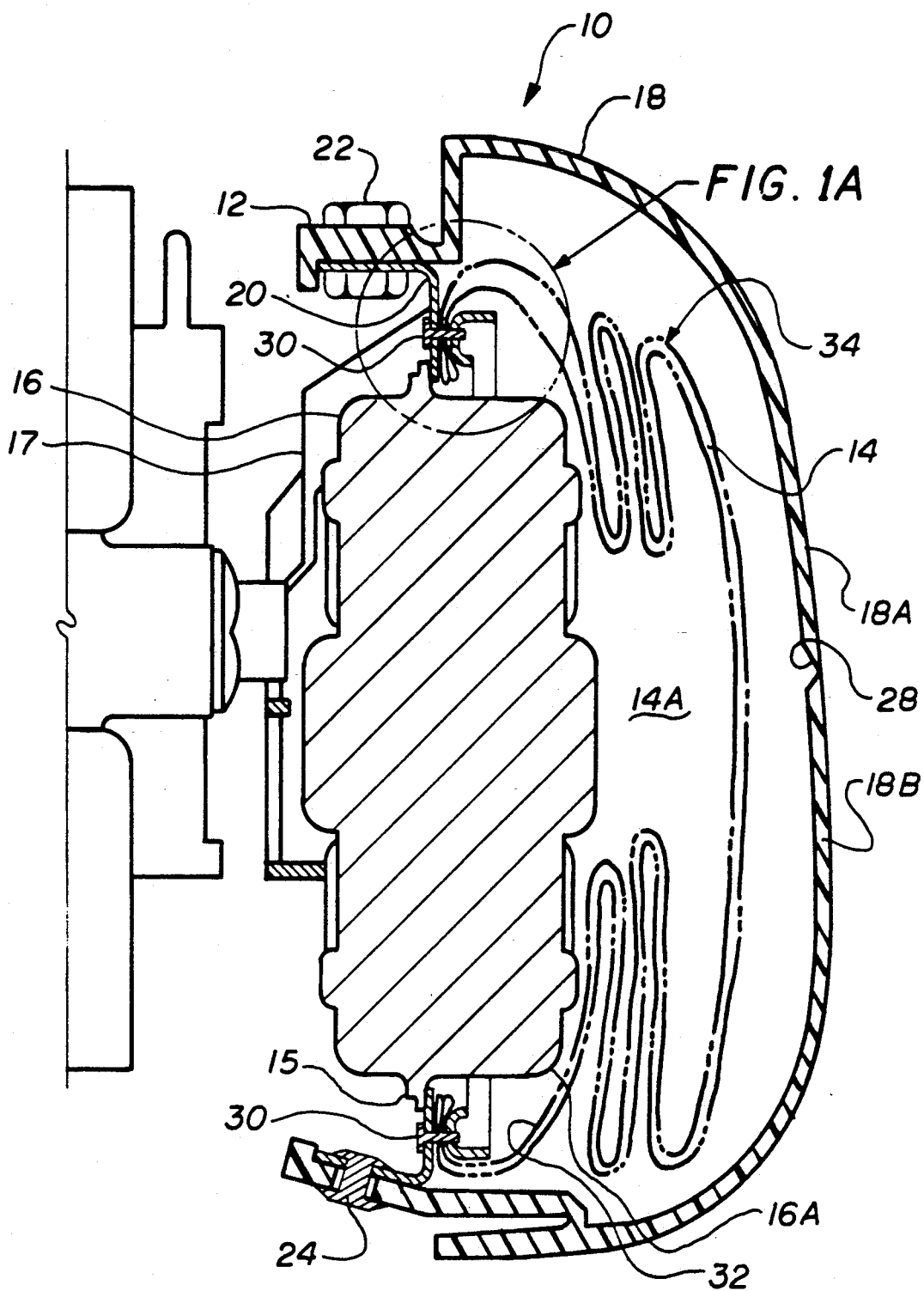
FIG. 1 is a sectional view of an air bag assembly incorporating an air bag constructed according to the principles of the present invention.

Referring now to the drawings, and particularly to FIG. 1, an air bag assembly shown generally at 10 comprises a container 12 that houses an air bag structure 14 and part of an inflator 16. The container comprises a cover 18 attached to a reaction plate 20 by fasteners 22, such as bolts, and fasteners 24, such as rivets. The cover 18 in part defines a receptacle in which the air bag structure 14 is stored in a collapsed, folded condition The cover 18 is formed of a tough, flexible plastic such as urethane or a thermoplastic polyolefin (TPO) elastomer. The inside of the cover 18 has one or more V-shaped grooves 28, which create a designed weakness in the cover, to enable the cover 18 to separate into segments 18A, 18B as the air bag is deployed (see FIG. 2). The air bag structure 14 is attached to the reaction plate 20 by fasteners such as rivets 30, as described more fully hereinafter.

The inflator 16 has a generally cylindrical shape with an annular gas dispensing portion 16A including an array of gas dispensing nozzles (not shown), as is well known in the art. The inflator 16 can have any of a number of known constructions, including the construction of U.S. Pat. No. 4,902,036, which is a preferred construction. The inflator 16 is coupled to the reaction plate 20 by rivets (not shown) which fasten a peripheral flange 15 on the inflator 16 to the reaction plate. The air bag assembly 10 can be assembled outside of the vehicle, and then loaded as a unit into a cup-shaped base member 17 which is fixed to and rotatable with a vehicle steering shaft. The air bag assembly can be fastened to the cup-shaped base member 17 by suitable fastening structure (not shown), as will be readily apparent to those in the art.

Figure 2:
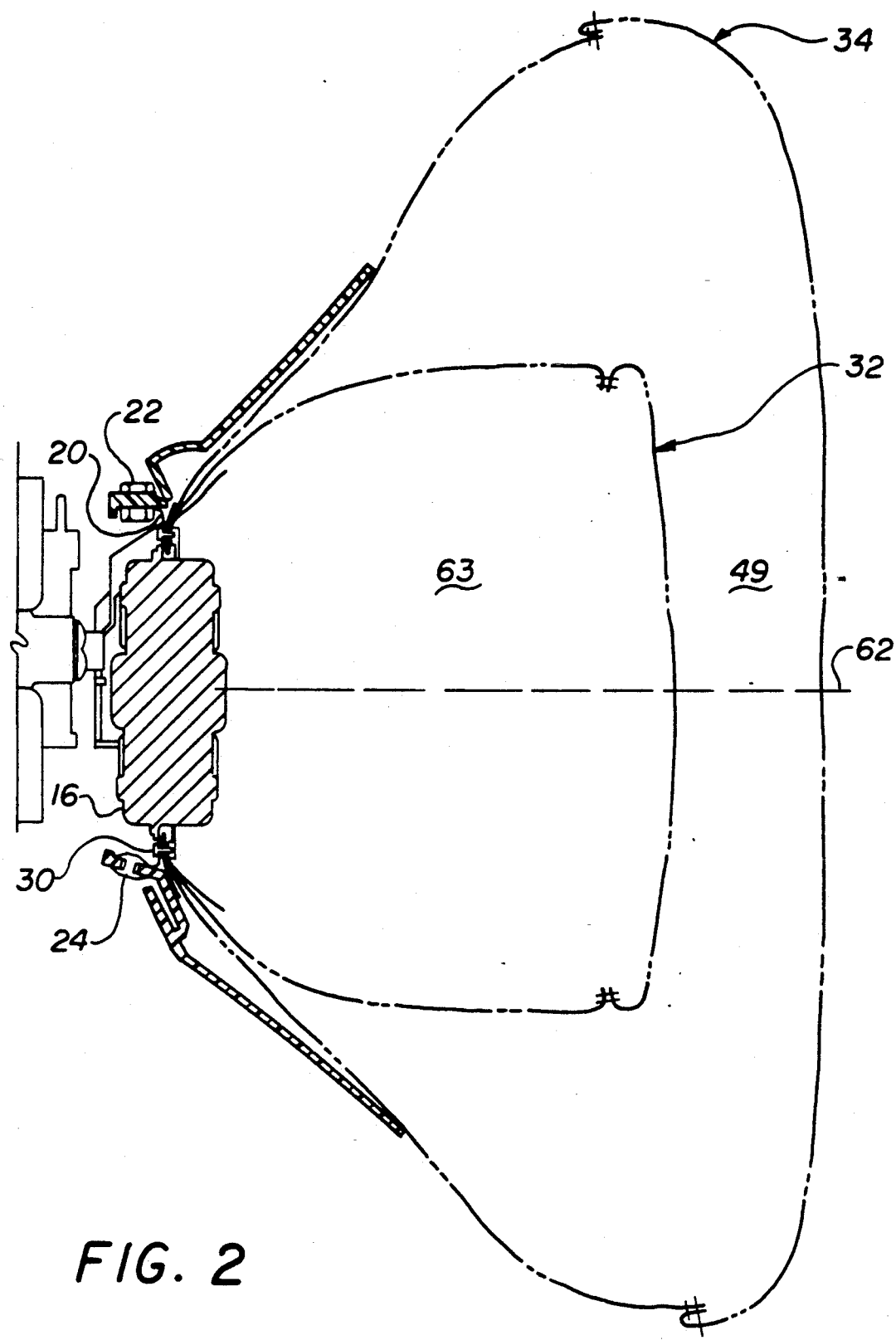
FIG. 2 is a schematic view of the air bag assembly of FIG. 1, with the air bag inflated to its predetermined configuration.

At the onset of a vehicle collision, the inflator 16 is actuated and rapidly discharges an inert, nontoxic gas (e.g., nitrogen). The gas is directed, under pressure, through the nozzles in the annular gas dispensing portion 16A. Since the gas dispensing portion 16A of the inflator is located inside the air bag structure 14, the gas directed from the nozzles in the gas dispensing portion 16A is directed into an interior cavity 14A in the air bag structure. The gas begins to inflate the air bag structure 14, which applies pressure to the cover 18. Such pressure forces the air bag structure 14 through the cover 18 and inflates the air bag structure 14 to a predetermined configuration (FIG. 2). According to the present invention, the air bag structure 14 is preferably inflated to a configuration which approximates the shape of an ellipsoid. When inflated to its predetermined configuration, the air bag structure 14 acts as a cushion which absorbs energy and retards movement of a vehicle occupant who is being pitched toward a structural part of the vehicle by the force of a collision.

Figure 3:
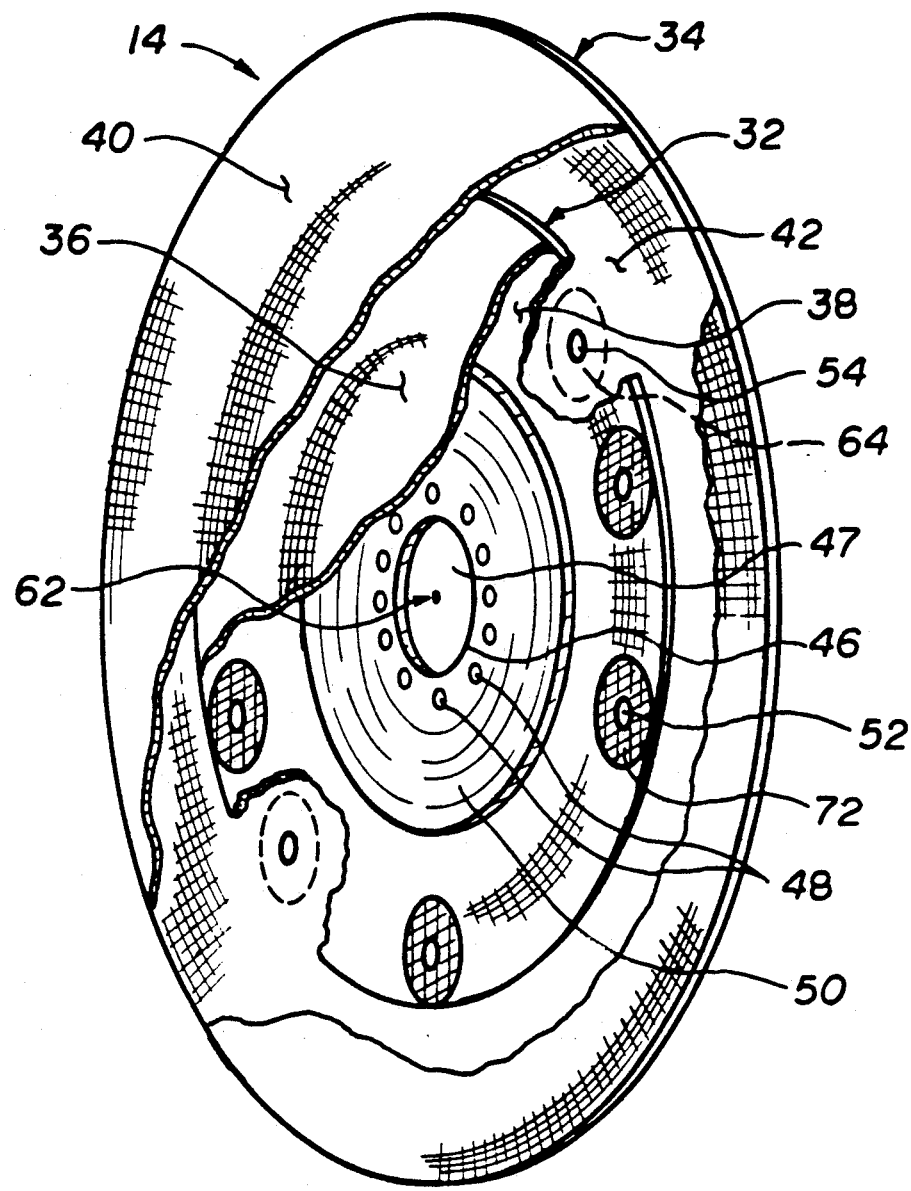
FIG. 3 is a perspective view of an air bag structure according to the present invention, with portions broken away.

The air bag structure 14 is preferably formed as a complete subassembly and is then folded to a predetermined configuration and fastened to the reaction plate 20. The air bag structure 14 as a complete subassembly (but prior to being folded) is illustrated in FIG. 3. The air bag structure 14 comprises an inner bag 32 contained within an outer bag 34. The inner bag 32 is comprised of a front panel 36 which is attached at its perimeter to a rear panel 38. Similarly, the outer bag 34 is comprised of a front panel 40 which is attached at its perimeter to a rear panel 42. Each of the front and rear panels is preferably circular in shape and is formed from a woven synthetic material, such as nylon. Certain of the surfaces of the front and rear panels may also be coated with a heat resistant material, such as neoprene, a synthetic rubber, to better withstand any heat that may be generated by the inflator during inflation. The inner and outer air bags have respective mouth portions which are attached together, and a mouth 46 of the air bag structure 14 is formed at the location of this attachment. The mouth 46 defines a fluid inlet opening 47 surrounding a central axis 62 and an array of mounting holes 48 which surround the fluid inlet opening. The mounting holes 48 form fastening structure which enables the air bag to be fastened to the reaction plate 20.

In the preferred embodiment of the present invention, a circular heat resistant member 50 is attached to the rear panel 38 of the inner bag, and a somewhat smaller reinforcement member 68 (FIG. 5) is attached to the rear panel 42 of the outer bag. Additionally, the rear panel 38 of the inner bag is provided with reinforced vent openings 52 for directing fluid from the inner bag 32 into the outer air bag 34 during inflation, as described more fully hereinafter. Moreover, the rear panel 42 of the outer bag 34 is provided with vents 54 enabling the air bag structure 14 to be deflated in a controlled fashion when the air bag is struck by a vehicle occupant.

Figure 4:
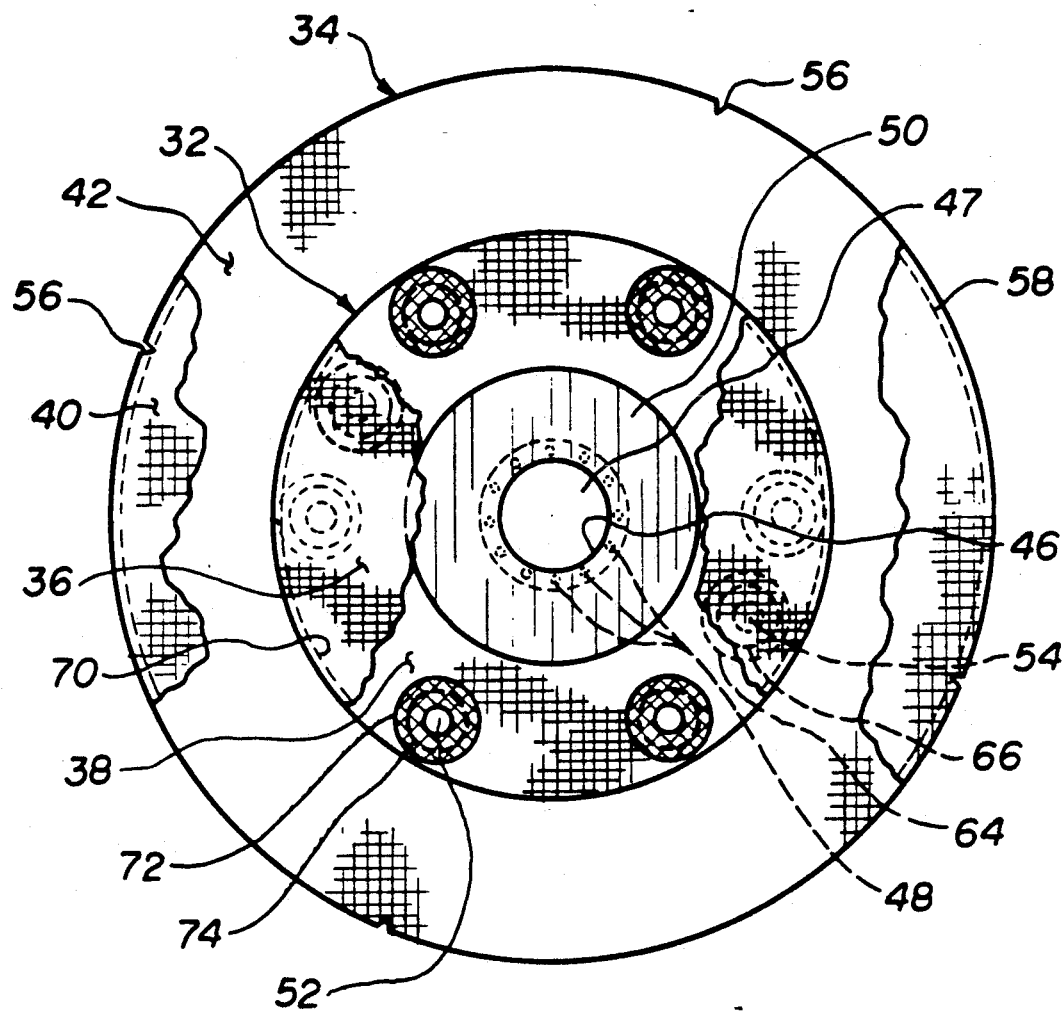
FIG. 4 is a front view of the air bag of FIG. 3, with portions broken away.

The front panel 40 and the rear panel 42 of the outer bag 34 are similarly sized, circular nylon panels (FIGS. 3, 4). The two panels are aligned using notches 56 located on the perimeter of each of the panels in order to orient the weave patterns of the two panels properly in transverse relationship with each other. The front and rear panels 40, 42 are attached together by sewing a seam 58 around the perimeter of the aligned panels. To enhance the heat resistivity of the outer bag, the surfaces of the panels 40, 42 facing the interior of the outer bag 34 may be coated with a heat resistant material such as neoprene.

When the front and rear panels 40, 42 are connected together to form the outer bag 34, an internal fluid cavity 49 is defined between the panels 40, 42. Fluid directed into the internal fluid cavity 49 causes the front and rear panels to bow outward relative to each other, to expand the outer bag 34 to its predetermined three dimensional configuration. When the outer bag 34 is expanded to its three dimensional configuration, a central portion of the front panel 40 defines an occupant impact area which is designed to be initially struck by an occupant who is being pitched toward a structural part of the vehicle during a vehicle collision.

As discussed above, the vents 54 in the rear panel 42 enable the air bag to be deflated in a controlled fashion after a vehicle occupant strikes the outer bag 34. In the preferred embodiment, two deflation vents 54 are disposed equal distances in opposite directions from the central axis 62. To prevent tearing or other damage to the air bag material surrounding each of these vents during inflation, reinforcement members 64 may be attached to the rear panel 42 at the vent locations. As shown, reinforcement members 64 have holes which are aligned with the deflation vents 54. Although the reinforcement members 64 are shown in FIG. 4 as attached to the side surface of the rear panel 42 which forms the exterior of the outer bag 34, the reinforcement members may be attached to either side surface of the rear panel 42. The reinforcement members 64 are preferably constructed of nylon or a similar material and are attached to the rear panel by sewing a single or double stitched seam 66 around the perimeters of the reinforcement members.

The front panel 36 and the rear panel 38 of the inner bag 32 are similarly sized circular panels which are sewn together at their respective perimeters with a single or double stitched seam 70. The front panel 36 is preferably constructed of woven nylon or a similar material which is coated with a heat resistant material such as neoprene on the surface which faces the interior the inner bag. The rear panel 38 is preferably constructed of woven nylon and is also coated with neoprene on the surface which faces the interior of the inner bag. In an alternative embodiment, the surfaces of both the front and rear panels opposite the interior surfaces also may be coated with neoprene. As still another alternative, the material of the front and rear panels 36 and 38 can be woven so as to be substantially impervious to fluid without a coating. In any event, in the preferred embodiment, the front and rear panels 36, 38 are substantially impervious to fluid.

When the front and rear panels 36, 38 are sewn together to form the inner bag 32, a fluid cavity 63 is formed in the inner bag. The front and rear panels 36, 38 are designed to bow outward relative to each other when fluid is directed into the fluid cavity 63. Thus, the inner bag 32 is expanded to a predetermined three dimensional configuration when fluid is directed into the fluid cavity 63.

Figure 1A:
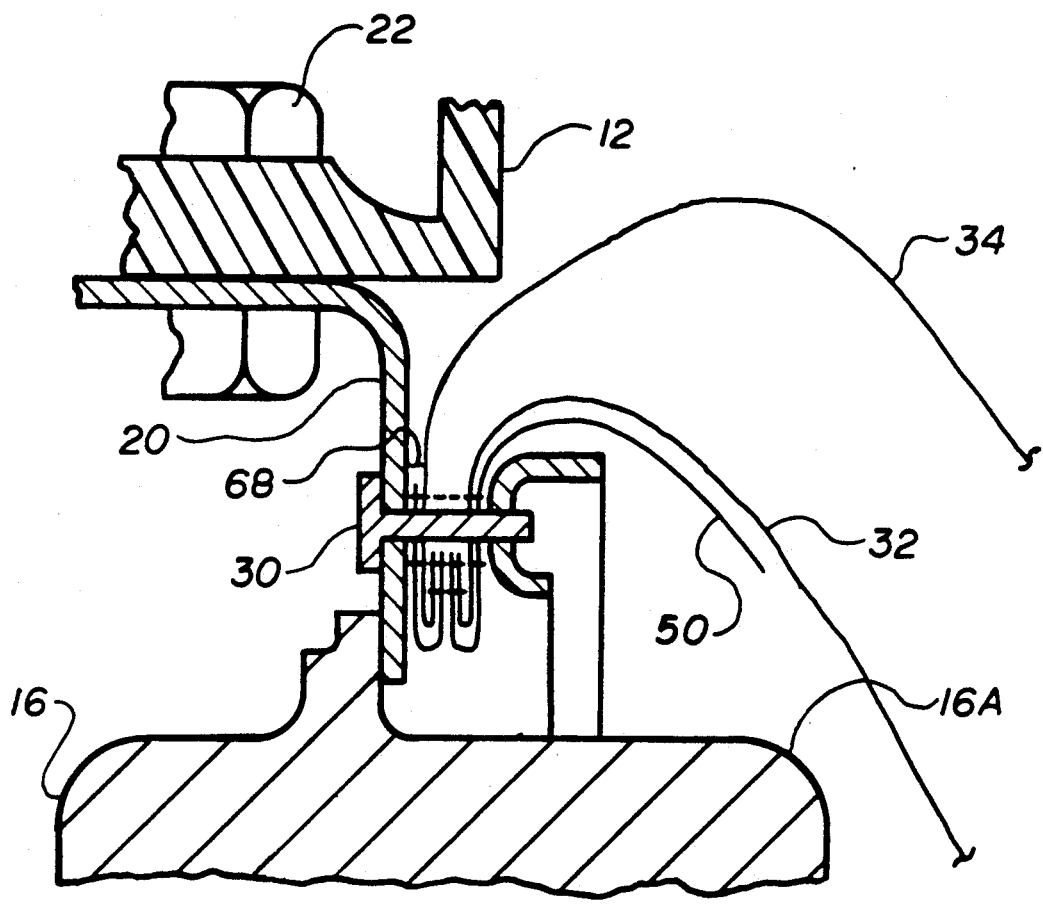
FIG. 1A is an enlarged schematic view of the portion of the air bag assembly shown at 1A in FIG. 1.

The mouth 46 of the air bag structure 14 is formed in the rear panels 38, 42 and in the heat protection and reinforcement members 50, 68 which are connected to the inner panels (see also FIGS. 5, 6). The mouth 46 is formed in such a manner that the fluid inlet opening 47 directs fluid from the inflator 16 into the cavity 63 of the inner bag 32. The mouth 46 incorporates the heat protection and reinforcement materials 50, 68 in such a manner as to reinforce the mouth and provide heat protection to specific areas of the mouth. Specifically, the reinforcement material 68 reinforces certain areas of the mouth, particularly in the area of the mounting holes 48. The heat protection material 50 is positioned so that when the air bag is incorporated into an air bag assembly, the heat protection material is closest to the gas discharge area 16A of the inflator (FIG. 1A).

When fluid from the inflator 16 is directed into the air bag 14, the fluid is initially directed into the cavity 63 of the inner bag 32 and expands the inner bag 32 to its three dimensional configuration. Fluid is directed from the inner bag 32 into the internal cavity 49 of the outer bag 34 via the vent holes 52 in the rear panel 38 of the inner bag 32. According to the principles of the present invention, the fluid is directed through the vent holes 52 in a pattern which is outward with respect to the central axis 62 and away from the front panel 40 of the outer bag 34. Specifically, a plurality of the vent holes 52 are formed in the rear panel 38 of the inner bag 32 (i) equidistantly spaced from the central axis 62 and (ii) equidistantly spaced from each other. As the front and rear panels of the inner and outer bags bow outward from each other, the vent holes 52 in the rear panel 38 of the inner bag 32 (FIG. 5) point toward the rear panel 42 of the outer bag 32. Hence, fluid flowing through each of the vent holes is directed outward in relation to the central axis 62 and rearward with respect to the occupant impact area which is defined by the front panel 40 of the outer bag 34. The diameters and number of the vent holes 52 determine the rate at which fluid flows from the inner bag 32 into the outer bag 34. By varying the diameters and number of these vents, the time frame during which the front panel 40 of the outer bag is pushed toward the vehicle occupant can be predetermined.

Like the deflation vents 54 located on the rear panel of the outer bag 34, the inflation vents 52 may be reinforced to prevent damage to the material surrounding the vents during inflation. Reinforcement members 72 having openings the same size as the vents 52 may be sewn to either side of the inner bag rear panel 38 using a single or double perimeter stitched seam 74. In the preferred embodiment, the reinforcement members 72 are constructed from the same material (e.g., nylon) as the inner bag rear panel 38.

In forming the air bag structure of FIGS. 3-6, reinforcement members 72 are initially sewn using perimeter seam 74 to the inner bag rear panel 38 at the desired locations of the vent holes 52. The vent holes 52 are formed by cutting or punching holes through the centers of the reinforcement members 72 and the adjacent portions of the rear panel 38. Similarly, reinforcement members 64 are sewn using perimeter seam 66 to the outer bag rear panel 42 at the desired locations of the deflation vents 54. The deflation vents are also formed by cutting or punching holes through the centers of the reinforcement members 64 and the adjacent portions of the rear panel 42.

Next, the circular gas inlet opening reinforcement member 68 and the circular heat resistant member 50 are placed between the inner and outer bag rear panels so that heat resistant member 50 is adjacent the inner bag rear panel 38 and reinforcement member 68 is adjacent the outer bag rear panel 42. Members 50 and 68, and panels 38 and 42 are aligned concentrically, and a seam 76 is sewn in the shape of a circle central to and through all four aligned layers of fabric. The fabric contained within this circular stitch pattern is then cut or punched out to form the mouth of the air bag structure.

The inner bag rear panel 38 and the heat resistant member 50 are pulled, from the side of the mouth on which they are located, through the mouth and folded back so that panel 38 is adjacent outer bag rear panel 42 (FIG. 6). A seam 78 is sewn adjacent to seam 76 around the perimeter of the mouth through all eight layers of fabric, forming a bead for the air bag mouth. A seam 80 is sewn around the perimeter of reinforcement member 68 through the rear panels 38, 42 and members 50, 68. Mounting holes 48 are punched around the perimeter of the air bag mouth intermediate seams 78 and 80. The resulting rear panel structure is ready to be attached to the inner bag and outer bag front panels to complete the air bag structure.

Finally, the outer bag rear panel 42 is pulled over the inner bag rear panel 38 and then through the mouth 46, from the side of the mouth on which the inner rear panel is located to the side on which the outer rear panel is located, and the circular front panel 40 is sewn to the rear panel 42 using a peripheral seam 58. The resulting outer bag 34 is then stuffed back through the mouth of the air bag, thereby inverting outer bag 34 so that seam 58 is not visible from the outside of the bag. In the preferred embodiment, a second outer bag seam 82 is sewn around the perimeter of the air bag.

Similarly, the inner bag rear panel 38 is pulled from inside of the outer bag 34 through the mouth 46, and the circular front panel 36 is sewn to the rear panel 38 with a peripheral seam 70. Preferably, the seam 70 is a double stitch. The resulting inner bag 32 is then stuffed back through the mouth of the air bag and completely into the outer bag 34, thereby completing formation of the air bag structure.

Figure 8:
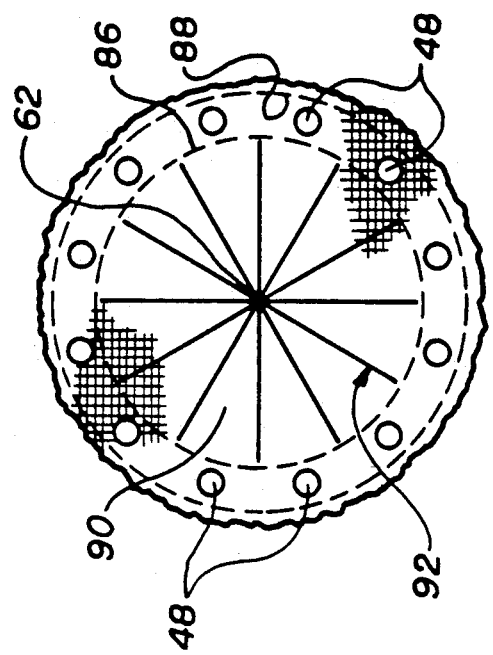
FIG. 8 is a schematic, fragmentary view of the air bag of FIG. 7, taken from the direction 8—8.
Figure 7:
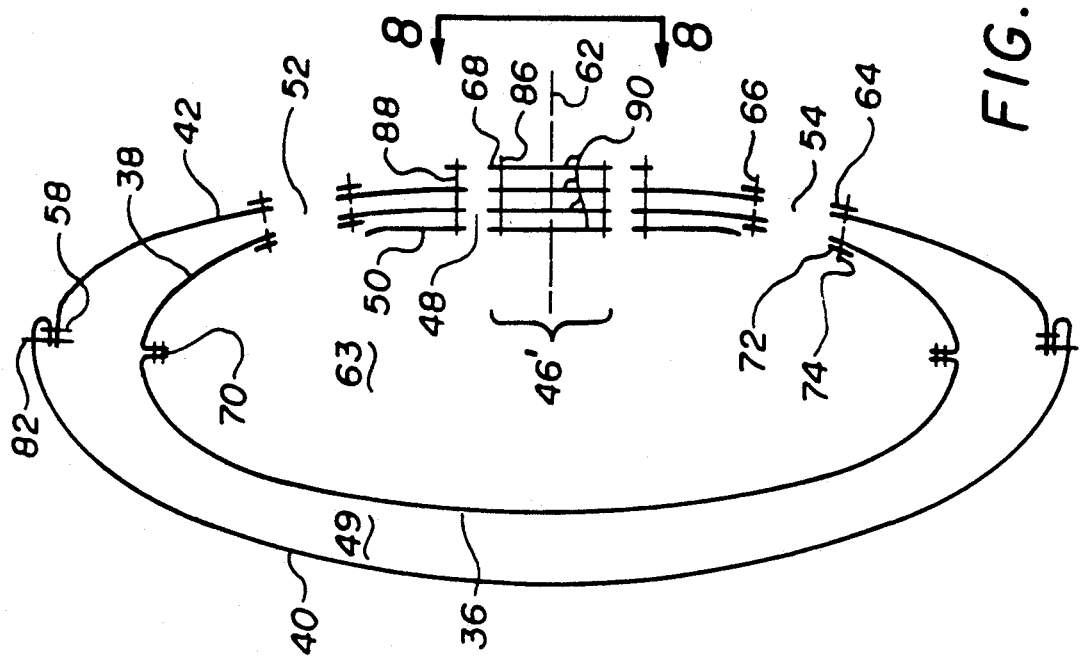
FIG. 7 is a schematic, sectional illustration of an air bag according to a modified form of the present invention.

A modified form for an air bag structure according to the invention having a mouth 46' is shown in FIGS. 7 and 8. The modified form of mouth is configured according to the principles of U.S. application Ser. No. 07/779,536, entitled "Air Bag Structure and Method of Forming" and assigned to the assignee of this application. In the modified form of the air bag structure 14, the mouth 46' is formed in an alternative manner. Specifically, the central portions of the aligned inner and outer bag rear panels 38, 40 and heat protection/reinforcement members 50, 68 are not removed nor are the members 50 and 68 folded back as shown in FIGS. 5, 6. Instead, the mouth 46' is formed by cutting a series of deflectable flaps 90 in the rear panels 38, 40 and the heat resistant/reinforcement members 50, 68.

As shown in FIGS. 7 and 8, the circular panels are arranged so that one side surface of the inner bag rear panel 38 is adjacent one side surface of the outer bag rear panel 42. The reinforcement member 68 is adjacent the other side surface of the outer bag rear panel 42, and the circular heat resistant member 50 is adjacent the other side surface of the inner bag rear panel 38. Members 50 and 68, and panels 38 and 42 are aligned concentrically, and seams 86 and 88 are sewn in the shape of a circle central to and through all four aligned layers of fabric. The mouth 46' and the mounting holes 48 are then formed by simultaneously (i) cutting slits through the fabric contained within the inner seam 86, so that each slit intersects axis 62 and (ii) punching mounting holes 48 between the inner seam 86 and the outer seam 88 to form the mounting structure for the air bag 14. In the illustrated embodiment, five intersecting slits are punched or cut through the fabric contained within the inner seam 86. The number of flaps 90 formed by the slits may vary with different embodiments of the present invention, depending on the number of intersecting slits punched or cut through the rear panel of the air bag. Moreover, certain of the flaps 90 may be removed should mounting or other considerations require their removal.

The flaps 90 overlie the annular gas dispensing portion 16A of the inflator 16 when the inflator is not actuated (see FIG. 1A). When the inflator 16 is actuated, gas is directed through the nozzles in the gas dispensing portion 16A of the inflator. Since the gas dispensing portion 16A is located in the mouth 46', the gas directed from the nozzles in the gas dispensing portion 16A is received in the mouth 46' and directed into the cavity 63 of the inner bag 32. The flaps 90 are blown axially into the cavity 63 of the inner bag 32, and radially outward with respect to the central axis 62.

The mounting holes 48 are spaced circumferentially around the perimeter of the mouth 46' at predetermined distances from each other. Each of the mounting holes 48 is positioned equidistant from the radially extending, intersecting edges 92 of an adjacent flap 90. The edges of the triangular flap 90 are formed by the slits which also create the flap. Accordingly, for a given size air bag, locating the mounting holes 48 in the manner disclosed is believed to maximize the distance over which the air bag must tear in order to tear away from the reaction plate 20 at the mounting holes 48.

During inflation of the air bag structure 14 having either mouth 46 or mouth 46', gas deflected by the heat resistant, substantially impervious front panel of the inner bag is directed out of the inner bag and through the inflation vents in a pattern which is both (i) radial with respect to the longitudinal axis extending between the mouth of the air bag and the front panel of the outer bag and (ii) toward the inflator. By spacing the vents circumferentially around the mouth at equal distances, the outer bag is uniformly inflated, and stresses generated during inflation are uniformly distributed across the outer bag structure. Uniform distribution of these stresses across the outer bag, coupled with the absorption of heat and energy by the front panel of the inner bag, prevents damage to the air bag material, especially at areas which are susceptible to stress damage, such as seams and the locations at which the air bag is attached to the inflator.

Moreover, this pattern of gas distribution permits the air bag to inflate radially or laterally with respect to the longitudinal axis of the bag. This lateral inflation reduces the velocity at which the front panel of the outer bag strikes a vehicle occupant during a collision. Reduced velocity is especially beneficial to a vehicle occupant who is positioned near the air bag module at the time of collision. In addition, lateral inflation limits the extent to which the front panel of the outer bag extends toward the occupant, thereby eliminating the need for internal tethers in the air bag.

The construction and method of forming the air bag structure according to the present invention has thus been described in its preferred form. However, with the present disclosure in mind, it is believed that obvious alternatives to the preferred embodiment, to achieve comparable advantages in other air bag structures will become apparent to those of ordinary skill in the art.

We claim:

1. A vehicle air bag structure comprising:
   outer and inner bags, each formed of flexible material;
   said outer bag having an internal fluid cavity and being expansible to a predetermined three dimensional configuration when fluid is directed into said sternal fluid cavity, a predetermined portion of said outer bag defining an occupant impact area when said outer bag is expanded to its predetermined three dimensional configuration;
   said inner bag being located in the internal cavity of said outer bag and being expansible to a predetermined configuration within said internal cavity when fluid is directed into said inner bag;
   said inner bag and said outer bag having respective mouth portions which are connected with each other and aid air bag structure having a mouth formed at least partially by said respective mouth portions, said mouth defining (i) a fluid inlet opening which enables fluid from an external source to be directed into said inner bag and (ii) fastening structure which enables said air bag structure to be fastened to a vehicle air bag assembly, said air bag structure having a central axis which extends through said fluid inlet opening and which is surrounded by said mouth; wherein said occupant impact area is located on a side of the outer bag opposite said mouth;
   said inner bag having venting structure for directing fluid from inside said inner bag into said internal fluid cavity of said outer bag, said venting structure directing fluid out of said inner bag only in directions which are outward from said central axis and away from the occupant impact area;
   said inner bag being substantially fluid impervious except for said venting structure.

2. A vehicle air bag structure as defined in claim 1, wherein said outer bag comprises a pair of front and rear outer panels which are connected with each other in a manner which enables said front and rear outer panels to bow outward relative to each other when fluid is directed into said internal cavity, said occupant impact area being located on said front outer panel and the mouth portion of said outer bag being located in said rear outer panel.

3. A vehicle air bag structure as defined in claim 2, wherein said inner bag comprises a pair of front and rear inner panels connected with each other in a manner that enables said front and rear inner panels to bow outward relative to each other as fluid is directed into said inner bag, the mouth portion of said inner bag and said vent structure being located in said rear inner panel of said inner bag.

4. A vehicle air bag structure as defined in claim 2, wherein said front and rear outer panels are each formed of fabric material and are sewn directly to each other along a peripheral outer seam to form said outer bag.

5. A vehicle air bag structure as defined in claim 3, wherein said front and rear inner panels are each formed of fabric material and are sewn directly to each other along a peripheral inner seam to form said inner bag.

6. A vehicle air bag structure as set forth in claim 2, wherein said inner and outer bags are configured such that said vent structure in said inner bag directs fluid from said inner bag toward said rear panel of said outer bag.

7. A vehicle air bag structure as set forth in claim 3, wherein said vent structure comprises a plurality of vent holes formed in said rear panel of said inner bag.

8. A vehicle air bag structure as defined in claim 7, wherein said plurality of vent holes are equidistantly spaced from said central axis and equidistantly spaced from each other about said central axis.

9. A vehicle air bag structure as defined in claim 3, wherein said front and rear inner panels are each formed of substantially fluid impervious fabric material.

10. A vehicle air bag structure as defined in claim 1, wherein flexible reinforcement material and flexible heat protection material are connected with said mouth portions of said inner and outer bags, said mouth of said air bag being at least partially formed by segments of flexible reinforcement and heat protection materials.

11. A method of forming an air bag having:
    (A) an outer expansible bag with an internal fluid cavity,
    (B) an inner expansible bag disposed in said internal fluid cavity,
    (C) a mouth defining:
        (i) a fluid inlet through which a central axis extends and which designed to direct fluid from an external source into said inner bag, and
        (ii) fastening structure which enables the air bag to be fastened to a vehicle air bag assembly;
    said method comprising the steps of:
    (a) providing front and rear outer panels for use in forming said outer bag,
    (b) providing a front inner panel for use in forming said inner bag which is substantially fluid impervious,
    (c) providing a rear inner panel for use in forming said inner bag which is substantially impervious except for a venting structure formed only in the rear inner panel,
    (d) connecting a mouth portion of the rear outer panel with a mouth portion of the rear inner panel,
    (e) forming the mouth of the air bag from the mouth portions of the rear inner and outer panels which are connected with each other,
    (f) connecting the front outer panel to the rear outer panel to complete the outer bag, and
    (g) connecting the front inner panel to the rear inner panel to complete the inner bag, the inner bag being subtantially fluid impervious except for the venting structure formed in the rear inner panel;
    the vent structure being configured to cause fluid directed into the inner bag to flow from the inner bag into the outer bag in a direction which is outward from the central axis and away from the front outer panel.

12. A method as set forth in claim 11, wherein the step of connecting the front inner and outer panels to the rear inner and outer panels, respectively, comprises:
   (A) connecting a peripheral edge of the rear outer panel to a peripheral edge of the front outer panel to complete the outer bag, and
   (B) thereafter connecting a peripheral edge of the rear inner panel to a peripheral edge of the front inner panel to complete the inner bag.

13. A method as set forth in claim 12, wherein each of the front inner and outer panels and the rear inner and outer panels comprises a flexible fabric material, and wherein:
   (A) the step of connecting a peripheral edge of the rear outer panel to a peripheral edge of the front outer panel comprises sewing the peripheral edge of the rear outer panel to a peripheral edge of the front outer panel and (B) the step of connecting a peripheral edge of the rear inner panel to a peripheral edge of the front inner panel comprises sewing the peripheral edge of the rear inner panel to a peripheral edge of the front inner panel.

14. A method as set forth in claim 11, wherein said step of providing a rear inner panel comprises forming a plurality of vent holes in a substantially fluid impervious fabric material.

15. A method as set forth in claim 14, wherein said step of forming a plurality of vent holes comprises forming said vent holes at locations which are equidistantly spaced from said central axis and equidistantly spaced from each other.

16. A method as set forth in claim 11, wherein each of said front and rear inner panels is formed of substantially fluid impervious flexible fabric material.

17. A method as set forth in claim 16, further comprising the steps of (i) connecting segments of flexible heat protection material and flexible reinforcement material to said mouth portions of said rear inner and outer panels, and (ii) forming said fluid inlet and the fastening structure in said segments of flexible heat protection and reinforcement materials at the same time as said fluid inlet and fastening structure are formed in said mouth portions of said inner and outer rear panels.

18. A method as set forth in claim 11, wherein said step of providing said front and rear outer panels comprises providing substantially circular front and rear outer panels, and wherein said step of providing said front and rear inner panels comprises providing substantially circular front and rear inner panels, each of said circular front and rear inner panels being smaller than both of said front and rear outer panels.

19. A method as set forth in claim 13, wherein said step of providing said front and rear outer panels comprises providing substantially circular front and rear outer panels, and wherein said step of providing said front and rear inner panels comprises providing substantially circular front and rear inner panels, each of said circular front and rear inner panels being smaller than both of said front and rear outer panels.

20. A method as set forth in claim 19, wherein said step of providing a rear inner panel comprises forming a plurality of vent holes in a substantially fluid impervious fabric material.

21. A method as set forth in claim 20, wherein said step of forming a plurality of vent holes comprises forming said vent holes at locations which are equidistantly spaced from said central axis and equidistantly spaced from each other.

* * * * *

UNITED STATES PATENT AND TRADEMARK OFFICE
CERTIFICATE OF CORRECTION

PATENT NO. : 5,249,824

DATED : October 5, 1993

INVENTOR(S) : Swann, et al.

It is certified that error appears in the above-identified patent and that said Letters Patent is hereby corrected as shown below:

At column 9, line 22, please delete "sternal" and insert -- internal --.

At column 9, lines 32, please delete "aid" and insert -- said --.

Signed and Sealed this

Third Day of May, 1994

Attest:

BRUCE LEHMAN

Attesting Officer

Commissioner of Patents and Trademarks